UNITED STATES PATENT OFFICE.

ADOLF GUSTAV JERICKA, OF GOTTLIEBEN, AND AUGUST EGGIMANN, OF ERMATINGEN, SWITZERLAND.

METHOD OF FINING BEER, &c.

SPECIFICATION forming part of Letters Patent No. 411,723, dated September 24, 1889.

Application filed June 15, 1889. Serial No. 314,473. (No specimens.)

*To all whom it may concern:*

Be it known that we, ADOLF GUSTAV JERICKA, a subject of the Emperor of Austria, residing at Gottlieben, Canton of Thurgovia, in Switzerland, and AUGUST EGGIMANN, a citizen of the Republic of Switzerland, residing at Ermatingen, in Switzerland, have jointly invented a certain new and useful Method of Fining Beer and other Liquids, (which has not been patented to ourselves or to others with our knowledge or consent in any country,) of which the following is a specification.

In the fining or clarifying of beer and other fermented liquids it has heretofore been customary to employ beech, hazel, or other wood shavings, (known in the trade as "brewers' shavings,") or else some inert material—such as sand, burnt clay, or fire-brick—which, after immersion in the fermented liquor, will attach and gather the floating particles of yeast and other impurities by their purely mechanical action upon the same. The use of fine shavings or other organic matter for this purpose is, however, objectionable, for the reason that in some cases fine particles of wood will become detached from the shavings and float around in the clarified liquor, (owing to their light specific gravity,) and these, if left in the beer for any length of time, will decompose and set up a secondary fermentation on their own account, which is apt to operate injuriously upon the quality of the product. This objection is overcome, it is true, by the employment of an inert porous material—such as burnt brick or fire-clay, for example; but this material, on the other hand, has been shown by experience not to possess the clarifying or fining properties of the shavings, and has therefore been used to only a very limited extent in the art of brewing. We have discovered, however, that by the peculiar method of using a porous inert substance, as hereinafter described, we can clarify or fine beer and other fermented liquors as perfectly and expeditiously as this has heretofore been done by the use of shavings, and without the drawbacks which have heretofore attached to the use of organic matter for this purpose, as well as to burnt clay or other porous material in the manner in which this has heretofore been used.

Our improved method consists simply in the saturation of the inert porous substance—such as burnt clay, pumice-stone, asbestus, or any equivalent porous and inert substance—with the unfermented "wort" before its immersion into the fermented liquor which is to be fined or clarified. By this preliminary treatment of the burnt brick or other porous material we have found that the process of fining is rendered both quicker and more efficacious, owing, probably, to the chemical action of the unfermented wort contained in the cells of the porous burnt brick, which, on coming in contact with the floating atoms of yeast gathered mechanically by the porous fining-stone and collected on the rough surfaces of the same, sets up an immediate ancillary fermentation in the vicinity of the stone, the tendency of which is, as above stated, to expedite and increase the efficacy of the fining or clarifying process. This preliminary saturation of the porous fining-stones may be quickly effected by placing them for a few moments in the boiler which contains the boiling wort or hop-liquor, care being taken that the stones are perfectly dry before their immersion. They are then removed and dropped into the vats containing the liquor undergoing fermentation or already fermented, in the usual manner.

Having thus described our invention, what we claim, and desire to secure by Letters Patent of the United States, is—

The herein-described method of fining fermented liquids or liquids undergoing fermentation, which consists in, first, saturating a suitable inert porous substance—such as burnt brick, for example—with the unfermented wort, and, secondly, immersing the porous substance so saturated into the fermented liquid or liquid undergoing fermentation, substantially as and for the purpose set forth.

In testimony whereof we have signed this specification in the presence of two subscribing witnesses.

ADOLF GUSTAV JERICKA.
AUGUST EGGIMANN.

Witnesses:
EMIL BLUM,
EMIL SCHMID-KEREZ.